US011647036B1

(12) United States Patent
Disney et al.

(10) Patent No.: US 11,647,036 B1
(45) Date of Patent: May 9, 2023

(54) ADVANCED INTERSTITIAL TECHNIQUES FOR WEB SECURITY

(71) Applicant: Shape Security, Inc., Santa Clara, CA (US)

(72) Inventors: Tim Disney, Mountain View, CA (US); Michael Ficarra, Sunnyvale, CA (US); Nitish Khadke, Mountain View, CA (US)

(73) Assignee: SHAPE SECURITY, INC., Santa Clara, CA (US)

( * ) Notice: Subject to any disclaimer, the term of this patent is extended or adjusted under 35 U.S.C. 154(b) by 227 days.

(21) Appl. No.: 17/024,201

(22) Filed: Sep. 17, 2020

Related U.S. Application Data

(60) Provisional application No. 62/902,174, filed on Sep. 18, 2019.

(51) Int. Cl.
*H04L 12/14* (2006.01)
*H04L 9/40* (2022.01)

(52) U.S. Cl.
CPC ...... *H04L 63/1425* (2013.01); *H04L 63/1416* (2013.01); *H04L 63/1441* (2013.01)

(58) Field of Classification Search
CPC ............. H04L 63/1425; H04L 63/1416; H04L 63/1441
See application file for complete search history.

(56) References Cited

U.S. PATENT DOCUMENTS

| | | | | | |
|---|---|---|---|---|---|
| 8,613,089 | B1* | 12/2013 | Holloway | ........... | H04L 63/1466 709/227 |
| 8,813,237 | B2* | 8/2014 | Amit | .................. | H04L 63/1483 713/172 |
| 8,918,515 | B1* | 12/2014 | Partow-Navid | ......... | H04L 67/14 709/227 |
| 11,374,915 | B1* | 6/2022 | Munsell | ................ | H04L 9/3213 |
| 2009/0327046 | A1* | 12/2009 | Caller | .................... | G06Q 30/02 705/7.32 |
| 2015/0180829 | A1* | 6/2015 | Yu | ....................... | H04L 63/0853 726/11 |

* cited by examiner

*Primary Examiner* — Kambiz Zand
*Assistant Examiner* — Afaq Ali
(74) *Attorney, Agent, or Firm* — Troutman Pepper Hamilton Sanders LLP (F5 Patents)

(57) ABSTRACT

A method non-transitory computer readable medium, device and system that receives one of one or more requests from a client to a web server system. An interstitial page is served to the client and comprises instrumentation code that, when executed at the client, collects telemetry data. The telemetry data is received and a threat analysis is performed on the telemetry data collected in association with the one of the requests. A determination is made on when, based on the performing the threat analysis, that the one of the requests is from a potential attacker. When the determination indicates the one of the requests is not from the potential attacker then the one of the requests is allowed.

28 Claims, 9 Drawing Sheets

ADVANCED INTERSTITIAL TECHNIQUES FOR WEB SECURITY

This application claims the benefit of Provisional Patent Application Ser. No. 62/902,174, filed Sep. 18, 2019, which is hereby incorporated by reference in its entirety.

FIELD

This technology generally relates to security techniques applicable to client and server systems and, more specifically, to advanced interstitial techniques for web security.

BACKGROUND

Web and mobile applications and API endpoints are being subjected to a growing number of sophisticated automation attacks resulting in large scale instances of fraud. This unwanted or malicious automation traffic to web and mobile applications can be perpetrated, by way of example, by: a) criminals looking to steal money or other value; or b) by businesses who want to appropriate another company's data to drive their own businesses. In particular, businesses misappropriating a company's website data are often labeled "scrapers" because they "scrape" inventory, pricing and catalog data off of public websites. What scrapers do can disrupt user experiences for legitimate human traffic and dramatically increase a website's operating costs. Website owners generally lack visibility into the scale of their scraping problem as well as the tools to manage and when necessary, limit scraping. However, the size and scale of the problem with criminals and scrapers is breath-taking. Between about 50% and 90% of traffic to websites is malicious or unwanted automation traffic.

Unfortunately, blocking fraudulent or unwanted automation traffic, while permitting legitimate human sessions to proceed without user friction is very challenging. To web sites and mobile applications, attackers may appear virtually identical to genuine users by for example hijacking their devices, simulating human behavior, and leveraging stolen identities. Additionally, these attackers are rapidly evolving tools and methods to perpetrate this fraud, making it harder for applications or even humans to tell the difference between real and fake.

Historically, the industry's typical approach to managing scraping attacks has been to serve a challenge to deter scraper bots from getting access to valuable resources. CAPTCHA is one sample challenge that is often presented to stop unwanted scraping. CAPTCHA worked for a time, but scrapers have now learned how to technically bypass it, and today it is ineffective at limiting unwanted or aggressive scraping. In other words, the industry response to managing scraper traffic is both ineffective (scrapers can easily bypass) and it introduces painful friction for legitimate human traffic (such as trying to solve CAPTCHAs).

Accordingly, there are ongoing attempts to address these issues, but these attempts to date have had limited degrees of success and often cause undue friction for end users resulting in undesirable decreases in usage and/or incomplete transactions for web content providers.

SUMMARY

A method implemented by a security server system comprising one or more security server apparatuses, server devices, or client devices includes receiving one of one or more requests from a client to a web server system. An interstitial page is served to the client and comprises instrumentation code that, when executed at the client, collects telemetry data. The telemetry data is received from the client and a threat analysis is performed on the telemetry data collected in association with the one of the requests. A determination is made on when, based on the performing the threat analysis, that the one of the requests is from a potential attacker. When the determination indicates the one of the requests is not from the potential attacker then the one of the requests is allowed.

A security server device, comprising memory comprising programmed instructions stored thereon and one or more processors configured to be capable of executing the stored programmed instructions to receive one of one or more requests from a client to a web server system. An interstitial page is served to the client and comprises instrumentation code that, when executed at the client, collects telemetry data. The telemetry data is received from the client and a threat analysis is performed on the telemetry data collected in association with the one of the requests. A determination is made on when, based on the performing the threat analysis, that the one of the requests is from a potential attacker. When the determination indicates the one of the requests is not from the potential attacker then the one of the requests is allowed.

A non-transitory computer readable medium having stored thereon instructions comprising executable code that, when executed by one or more processors, causes the one or more processors to receive one of one or more requests from a client to a web server system. An interstitial page is served to the client and comprises instrumentation code that, when executed at the client, collects telemetry data. The telemetry data is received from the client and a threat analysis is performed on the telemetry data collected in association with the one of the requests. A determination is made on when, based on the performing the threat analysis, that the one of the requests is from a potential attacker. When the determination indicates the one of the requests is not from the potential attacker then the one of the requests is allowed and an interstitial cookie is provided to the client that, when validated, allows a subsequent one of the requests from the client without performing the threat analysis on subsequent telemetry data collected in association with the subsequent one of the requests.

A security system, comprising one or more security server apparatuses, server devices, or client devices with memory comprising programmed instructions stored thereon and one or more processors configured to be capable of executing the stored programmed instructions to receive one of one or more requests from a client to a web server system. An interstitial page is served to the client and comprises instrumentation code that, when executed at the client, collects telemetry data. The telemetry data is received from the client and a threat analysis is performed on the telemetry data collected in association with the one of the requests. A determination is made on when, based on the performing the threat analysis, that the one of the requests is from a potential attacker. When the determination indicates the one of the requests is not from the potential attacker then the one of the requests is allowed.

This technology provides a number of advantages including providing methods, non-transitory computer readable media, devices and systems that provide advanced interstitial techniques for effective web security. With examples of this technology, a web content provider may have effective web security while still reducing user friction for legitimate users. In particular, with examples of this technology a web content provider may reduce negative impacts caused by increased user friction, such as decreased usage and/or incomplete transactions. Additionally, with examples of this technology a web content provider may better protect its users and itself from fraudsters and these security features may be provided relatively simply for the web content providers with minimal modification by the web content provider to hardware or software on its own server systems. Further, with examples of this technology a security code and/or system can be provided flexibly by an organization that specializes in web security, which can in turn keep the security code updated to address ever-changing security threats. With these examples, such a security organization can also aggregate data received across many entities that operate many domains, including telemetry data and/or analyzed telemetry data and can use the aggregated data to generate countermeasures that are more effective than countermeasures that could be developed using only data from a single domain. Additional features and advantages are apparent by way of the examples of the technology illustrated and described herein.

Figure 1:
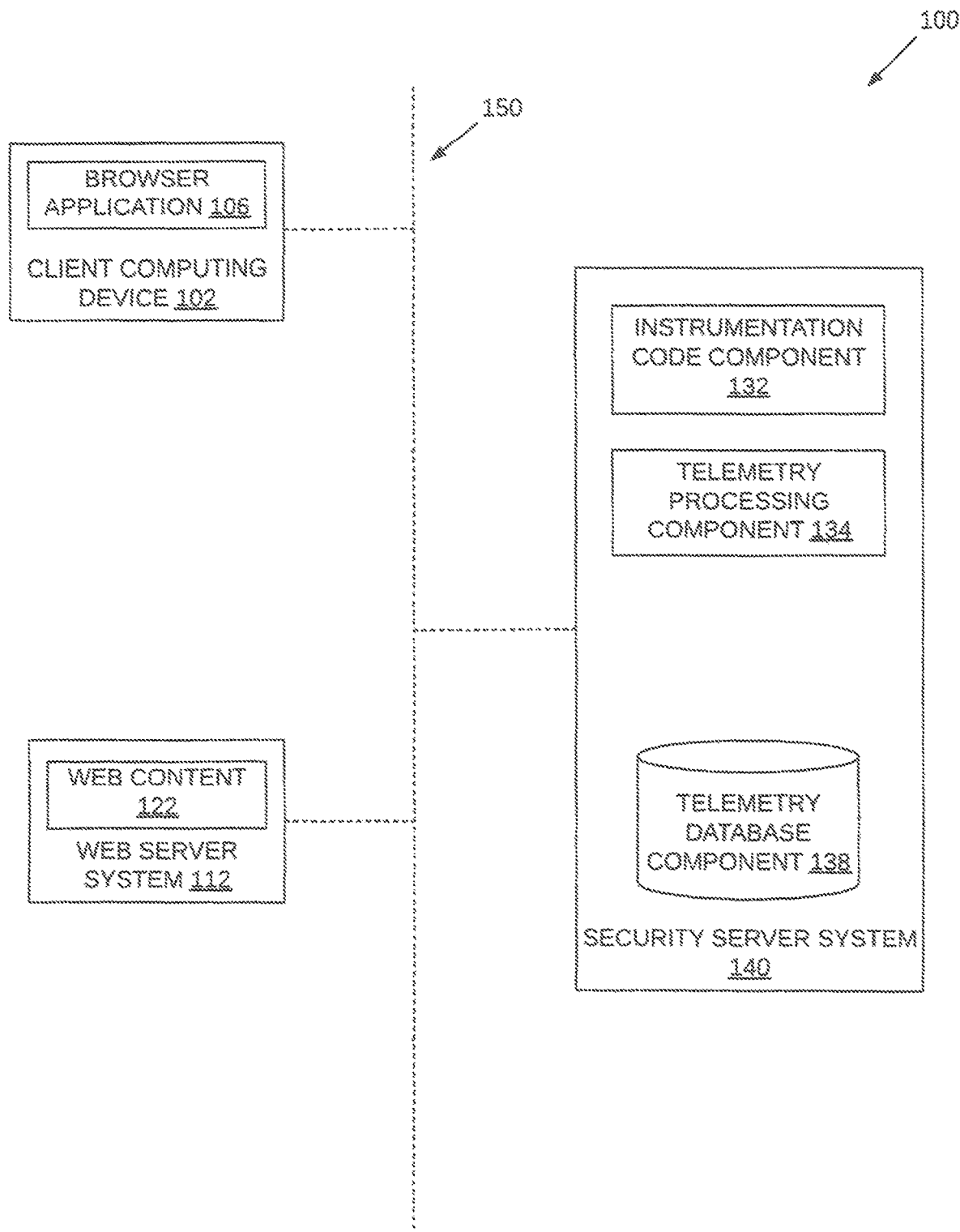
FIG. 1 is a block diagram of an example of a security system that includes a security server system.

While each of the drawing figures illustrates a particular example for purposes of illustrating a clear example, other examples may omit, add to, reorder, or modify any of the elements shown in the drawing figures. For purposes of illustrating clear examples, one or more figures may be described with reference to one or more other figures, but using the particular arrangement illustrated in the one or more other figures is not required in other examples

DETAILED DESCRIPTION

In the following exemplary description, for the purpose of explanation, numerous specific details are set forth in order to provide a thorough understanding of examples of this technology. It will be apparent, however, that examples of this technology may be practiced without these specific details. In other instances, well-known structures and devices are shown in block diagram form in order to avoid unnecessarily obscuring examples of this technology.

It will be further understood that: the term "or" may be inclusive or exclusive unless expressly stated otherwise; the term "set" may comprise zero, one, or two or more elements; the terms "first", "second", "certain", and "particular" are used as naming conventions to distinguish elements from each other and does not imply an ordering, timing, or any other characteristic of the referenced items unless otherwise specified; the terms "such as", "e.g.", for example", and the like describe one or more examples but are not limited to the described example/s; the terms "comprises" and/or "comprising" specify the presence of" stated features, but do not preclude the presence or addition of one or more other features.

A "computer system" refers to one or more computers, such as one or more physical computers, virtual computers, and/or computing devices. As an example, a computer system may be, or may include, one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to a "computer system" herein may mean one or more computers, unless expressly stated otherwise. When a computer system performs an action, the action is performed by one or more computers of the computer system.

A "client" refers to a combination of integrated software components and an allocation of computational resources, such as memory, a computing device, and processes on a computing device for executing the integrated software components. The combination of the software and computational resources are configured to interact with one or more servers over a network, such as the Internet. A client may refer to either the combination of components on one or more computers, or the one or more computers.

A "server" (also referred to as "server system", "server computer system", or "server apparatus") refers to a combination of integrated software components and an allocation of computational resources, such as memory, a computing device, and processes on the computing device for executing the integrated software components. The combination of the software and computational resources provide a particular type of function on behalf of clients of the server. A server may refer to either the combination of components on one or more computers, or the one or more computers. A server may include multiple servers; that is a server may include a first server computing device and a second server computing device, which may provide the same or different functionality to the same or different set of clients.

General Overview

This document generally describes systems, methods, devices, and other exemplary implementations of advanced interstitial techniques for web security. An interstitial page is served to a client computing device that requests a protected resource from a web server system. The interstitial page includes instrumentation code that collects telemetry data at the client computing device. A threat analysis is performed on the telemetry data to determine whether the request is from a potential attacker. Based on an outcome of the threat analysis, an interstitial cookie may be set at the client computing device that allows future requests without performance of the threat analysis. A valid interstitial cookie may allow a subsequent request from the client computing device to be processed without performing a threat analysis on telemetry data collected in association with the subsequent request. For example, the request may be automatically forwarded to the web server system without collecting telemetry data using an interstitial page.

The threat analysis may be tailored to detect particular types of potential attackers. For example, the threat analysis may be configured to determine whether the request at the client computing device is initiated by a human user or automated software. In some examples, the threat analysis is configured to detect whether the request is part of an attack of one or more types. For example, the threat analysis may detect whether the request is likely for scraping protected content. In some examples, the advanced interstitial techniques described herein are used to implement an invisible challenge to protect the protected resource from automated access without creating undue user friction for a legitimate user.

The interstitial page may be provided in a manner that does not require a redirect in a browser application at the client computing device. For example, after an interstitial page is used to collect telemetry data that passes the threat analysis, the protected content may be written into the interstitial page. When the protected content is written into the interstitial page, a browsing history at the client computing device will include a single visit to the protected resource. In some examples, the web server system will also reflect a single visit from the client computing device to the protected resource.

The various exemplary techniques described herein may for example achieve one or more of the following advantages: a web content provider may reduce user friction for legitimate users; in particular, the web content provider may reduce negative impacts caused by increased user friction such as decreased usage and/or incomplete transactions; the web content provider may better protect its users and itself from fraudsters; such features may be provided relatively simply for the web content providers in certain implementations; in particular implementations, such features can be added with minimal modification by the web content provider to hardware or software on its own server systems; security code and/or systems can be provided flexibly by an organization that specializes in web security, which can in turn keep the security code updated to address ever-changing security threats; such a security organization can also aggregate data received across many entities that operate many domains, including telemetry data and/or analyzed telemetry data; such a security organization can use such aggregated data to generate countermeasures that are more effective than countermeasures that could be developed using only data from a single domain. Additional features and advantages are apparent from the examples of this technology illustrated and described herein.

System Overview

Referring to FIG. 1, a block diagram of an example of computer system 100 that includes an example of a security server system 140 is illustrated. The computer system 100 includes at least one client computing device 102, at least one web server system 112, and a security server system 140, although the system could include other types and/or numbers of other systems, devices, components, and/or other element in other configurations. The client computing device 102, the web server system 112 and the security server system 140 communicate over one or more networks 150. The network/s 150 may include one or more local area networks (LANs) and/or one or more wide area networks, such as the Internet. The network arrangement and connectivity between the client computing device 102, the web server system 112 and the security server system 140 in this and other examples may vary.

In this example, the web server system 112 hosts web content 122, making the web content 122 available to the client computing device 102. For example, the web content 122 may include one or more web pages, images, audio, video, messages, files, data, scripts, services, application content, and other content available over the network/s 150, although other types of content or other data and/or instructions may be stored. In some examples, the web content 122 includes any data, instructions, or other content provided by the web server system 112 over the Internet, such as a response to a request from the client computing device 102.

The security server system 140 may implement one or more advanced interstitial techniques for web security as illustrated and described by way of the examples herein. In some examples, the security server system 140 includes an instrumentation code component 132, a telemetry processing component 134, and a telemetry database component 138, although the security server system 140 may comprise other types and/or numbers of components and/or other elements.

The security server system 140 and/or its components (e.g. instrumentation code component 132, telemetry processing component 134, and/or telemetry database component 138) as described by way of the example herein are presented as individual components for ease of explanation. Any action performed by or to one or more components of the security server system 140 may in these examples be considered performed by or to the security server system 140. The security server system 140 and/or its components may be implemented as one or more dependent or independent processes, and may be implemented on one or multiple computers. For example, a component may be implemented as a distributed system. Alternatively and/or in addition, multiple instances of one or more components may be implemented. Furthermore, a component shown may be implemented fully and/or partially in one or multiple programs and/or processes, and two or more components shown may be implemented fully and/or partially in the same program and/or process.

Protected Resource

The security server system 140 may use advanced interstitial techniques to secure a protected resource in the web content 122 hosted by the web server system 112. In some examples, the security server system 140 uses one or more advanced interstitial techniques described by way of the examples herein to protect a web resource referenced by a particular Uniform Resource Locator (URL) when the client computing device 102 requests the protected resource.

A request for a protected resource may for example be initiated by a browser application 106 executing on the client computing device 102. As used herein, the term "browser application" refers to any client application that interacts with web servers over the Internet, such as by sending requests and receiving responses using the HTTP protocol. A browser application may include a stand-alone browser for execution on a computing device, a mobile browser for execution on a mobile computing device, a native application on a computing device, such as, but not limited to, a mobile computing device, an in-app browser that is integrated into another application, a web crawler application, a headless browser, other automated bots and/or other automated software, and any other software application that interacts with web servers over the Internet.

Instrumentation Code

In this example, the instrumentation code component 132 provides instrumentation code to collect telemetry data about particular signals at each of the client computing device 102. As used herein, the term "instrumentation code" refers to source code, bytecode, binary software, or other code that is executed on a computer to collect data at the computer. For example, instrumentation code may be JavaScript that collects and/or otherwise generates data on a client and sends that data, referred to as telemetry data, to a server.

In some examples, the instrumentation code may include instructions to send collected telemetry data to a server, such as security server 140 by way of example, over one or more requests or transactions. For example, the instrumentation code may, when executed at the client computing device 102, execute an XML HTTP Request (XHR) that provides the telemetry data to the security server system 140. The security server system 140 may receive the telemetry data directly from the client computing device 102 or indirectly via one or more other computers or other systems.

In some examples, the instrumentation code component 132 provides instrumentation code to the client computing device 102 when the client computing device 102 interacts with the web server system 112. For example, the instrumentation code component 132 may provide instrumentation code for execution at the client computing device 102 when the client computing device 102 requests the web content 122 from the web server system 112, such as but not limited to protected content.

In some examples, the security server system 140 provides instrumentation code to collect telemetry data during one or more particular interaction types. For example, the instrumentation code component 132 may provide instrumentation code to the client computing device 102 when the client computing device 102 requests to log in to the web server system 112.

The instrumentation code may be provided in different formats. For example, the instrumentation code may include JavaScript code, and/or other web code that executes in a browser or other JavaScript engine at the client computing device 102. In some examples, the instrumentation code may include bytecode, such as JavaScript bytecode.

In some examples, the instrumentation code component 132 provides different instrumentation code in different situations. For example, the instrumentation code component 132 may provide different instrumentation code to clients of different web server systems. In some examples, the instrumentation code component 132 provides different instrumentation code for different client computing devices. For example, different instrumentation code may be provided when client computing devices are running different browsers, operating systems, or other software (including different versions thereof), or when the security server system 140 determines that client computing device or devices pose a different amount or type of security risk.

Telemetry Data

The telemetry processing component 134 may receive and process telemetry data collected at the client computing device 102. In some examples, the telemetry processing component 134 maintains a telemetry data set that includes telemetry data collected for a plurality of interactions between the client computing device 102 and the web server system 112. For example, the telemetry processing component 134 may store the telemetry data set in a telemetry database component 138 that is accessible to other components of the security server system 140 to implement advanced interstitial techniques, although the telemetry data may be stored at other locations.

The instrumentation code may collect telemetry data at the client computing device 102. As used herein, the term "signal" refers to an object used to convey telemetry data, such as a particular property and/or aspect of: a computing environment at one or more of the client computing device 102, one or more operating states of the client computing device 102, one or more operations performed at the client computing device 102, and user interaction at the client computing device 102, although other types of signals and/or other properties and/or aspects at the client computing device 102 may be collected. As used herein, the term "signal value" refers to a value for a signal (e.g. the specific type of data) at the client computing device 102, as detected by the instrumentation code. For example, a signal may be an IP address, while a signal value collected at the client computing device 102 is the IP address of the client computing device 102 (e.g. 123.456.78.9). Other signals may include network properties, operating system properties, browser properties, installed software properties, display size, other hardware properties, device configuration properties, information about execution of web code or other web content, information about processing of web content, information about human or software interactions with the web content, information about user inputs at the client computing device 102, and other signals that are collectable when the instrumentation code is executed at the client computing device 102. In some examples, a different number of signals may be collected for different transactions.

Threat Analysis

In this example, a threat analysis may be performed on the telemetry data to determine whether the request is from a potential attacker. Based on an outcome of the threat analysis, an interstitial cookie may be set at the client computing device 102 that allows future requests without performance of the threat analysis. A valid interstitial cookie at the client computing device 102 may allow a subsequent request from that the client computing device 102 to be processed without collecting additional telemetry data in association with the subsequent request and/or performing a threat analysis on the additional telemetry data. For example, the request may be automatically forwarded to the exemplary web server system 112 without collecting telemetry data using an interstitial page. Additionally, sufficient information about the original client request may in some examples be included in the subsequent response (with the interstitial page) and request (the telemetry) for the server to fully reconstruct the original client request which provides transparency.

In this example, the threat analysis may be tailored to detect particular types of potential attackers. For example, the threat analysis may be configured to determine whether the request at the client computing device 102 is initiated by a human user or automated software. In some examples, the threat analysis is configured to detect whether the request is part of an attack of one or more types. For example, the threat analysis may detect whether the request is likely for scraping protected content. In some examples, the advanced interstitial techniques described herein are used to implement an invisible challenge to protect the protected resource from automated access without creating undue user friction for a legitimate user.

The threat analysis may evaluate telemetry data collected on one or more signals. For example, the threat analysis may determine whether an IP address is associated with a higher security risk, such as a blacklisted ASN associated with automated browser activity. In some examples, the threat analysis may be configured to detect traffic generated by automated software so that requests generated by automated software will not pass the threat analysis.

Decision Tree Overview

Figure 2:
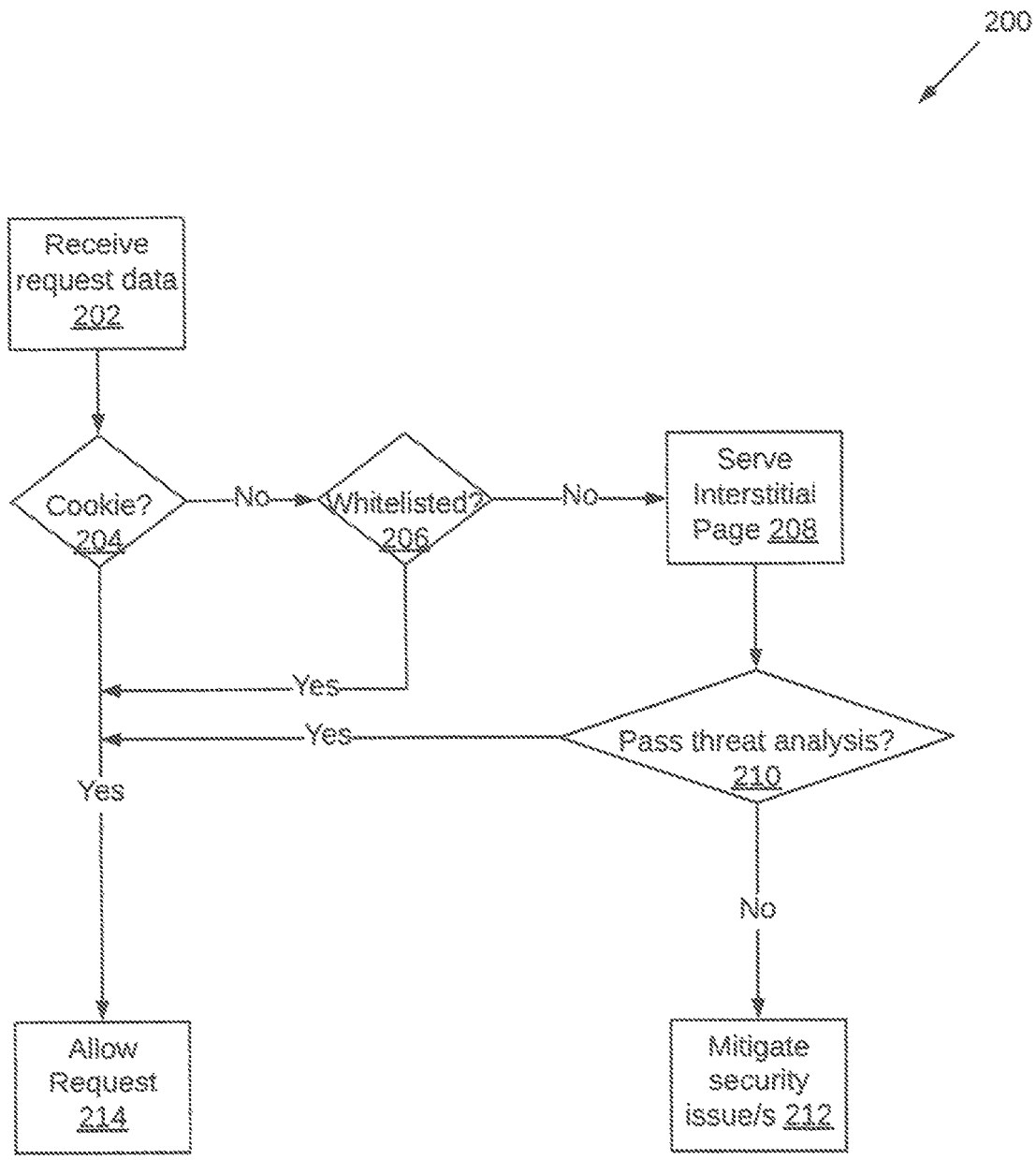
FIG. 2 is a flow chart of an example of a method for handling requests for a protected web resource.

Referring to FIG. 2, an example of a method 200 for handling requests for a protected web resource is illustrated, although this method can be used for other types of requested content. Method 200 may be performed by a security server system (e.g. security server system 140) but is not limited to performance thereby.

At step 202, request data is received in this example by security server system 140 that describes a request. For example, the request may be from the client computing device 102 to the web server system 112 for a protected resource, although other types of content may be requested.

At step 204, the security server system 140 determines whether the request from the client computing device 102 to the web server system 112 includes an interstitial cookie. If in step 204 the security server system 140 determines the request from the client computing device 102 to the web server system 112 includes an interstitial cookie, then the Yes branch is taken to step 214. In step 214, the request from the client computing device 102 is allowed and is transmitted processed by the the web server system 112 which send a response to the request back to the requesting the client computing device 102.

If in step 204 the security server system 140 determines the request from the client computing device 102 to the web server system 112 does not includes an interstitial cookie, then the No branch is taken to step 206. At step 206, the security server system 140 determines whether the request from the client computing device 102 to the web server system 112 is whitelisted traffic. If in step 206 the security server system 140 determines the request from the client computing device 102 to the web server system 112 is whitelisted traffic, then the Yes branch is taken to step 214 to be processed as described in this example earlier.

If in step 206 the security server system 140 determines the request from the client computing device 102 to the web server system 112 is not whitelisted traffic, then the No branch is taken to step 208. At step 208, the security server system 140 serves an interstitial page to the requesting client computing device 102. In this example, the interstitial page includes instrumentation code that collects telemetry data at the requesting device as illustrated and described by way of the examples herein.

At step 210, the security server system 140 determines whether the request from the client computing device 102 to the web server system 112 passes a threat analysis based on the telemetry data includes an interstitial cookie. If in step 210, the security server system 140 determines the request passes threat analysis, then the Yes branch is taken to step 214 where the request is allowed as described earlier.

If in step 210, the security server system 140 determines the request does not passes threat analysis, then the No branch is taken to step 212. In step 212, the security server system 140 may initiate one or more mitigating actions to mitigate any security issues identified by the threat analysis. One or more example scenarios and/or outcomes of method 200 are described in greater detail hereinafter.

First-Time Visitor

Figure 3:
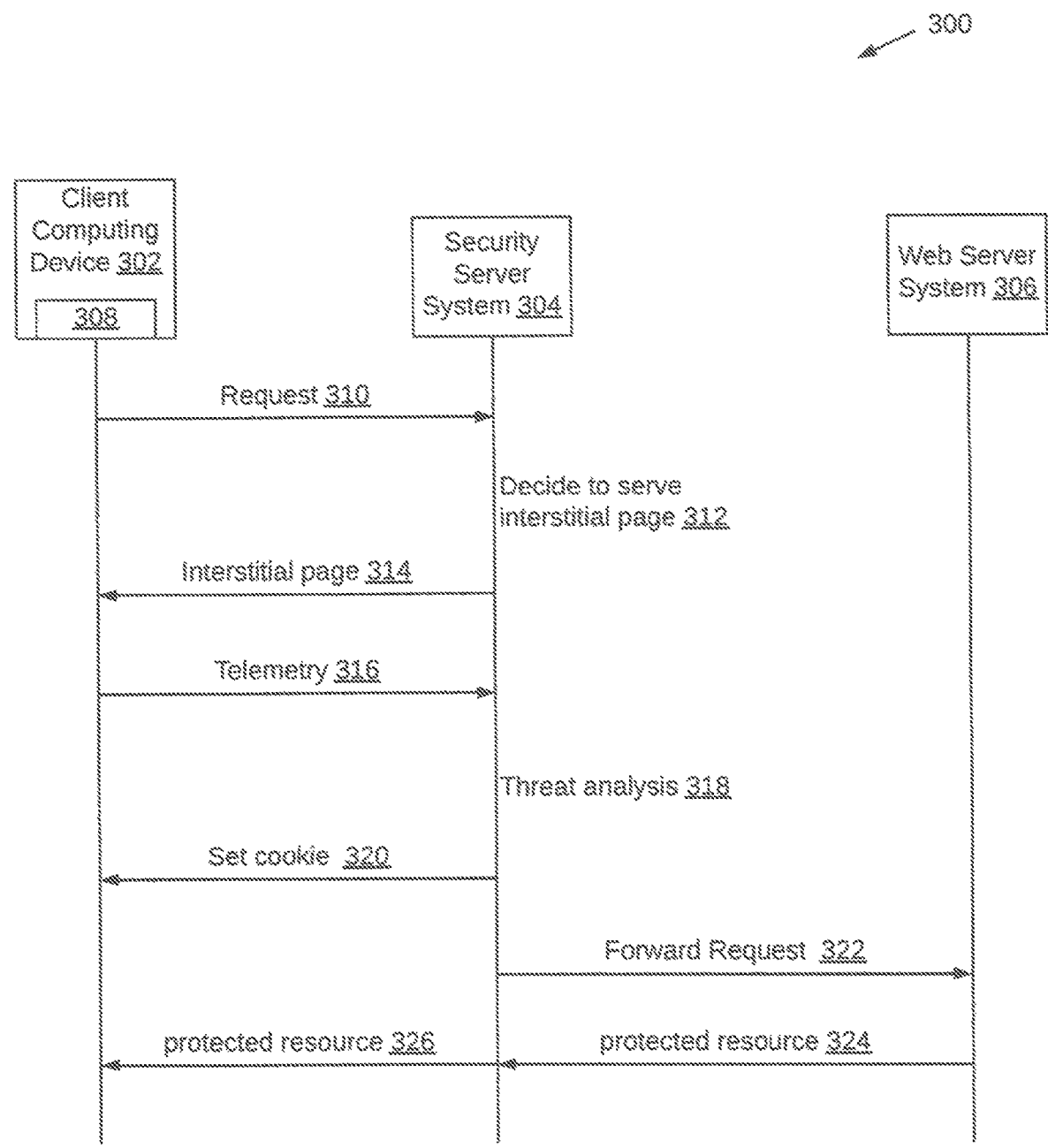
FIG. 3 is a sequence diagram of an example of a method for handling a request from a client.

Referring to FIG. 3, a sequence diagram of an example of a method 300 for handling a request from a first-time visitor is illustrated. In this example, the first-time visitor at a client computing device 302 does not have an interstitial cookie and the request is not whitelisted traffic. Additionally, in this example the method 300 involves a client-side browser application 308 executing at a client computing device 302, a security server system 304, and a web server system 306. The client computing device 308 in FIG. 3 is the same in structure and operation as the client computing device 102 illustrated and described in the examples in FIGS. 1-2, except as otherwise illustrated and described by way of the examples herein. Additionally, the security server system 304 in FIG. 3 is the same in structure and operation as the security server system 140 illustrated and described in the examples in FIGS. 1-2, except as otherwise illustrated and described by way of the examples herein. Further, the web server system 306 in FIG. 3 is the same in structure and operation as the web server system 112 as illustrated and described in the examples in FIGS. 1-2, except as otherwise illustrated and described by way of the examples herein. In some examples, method 300 takes into account any traffic that lands on a protected page that is not whitelisted and is landing on the protected page for the first time.

At 310, the security server system 304 may receive request data describing a request from the client-side browser application 308 to the web server system 306. The request may be for a protected page or other protected resource at the web server system 306, although other types of content may be requested. The security server system 304 may directly receive the request data from the client computing device 302, or may indirectly receive the request data, such as from the web server system 306.

At 312, the security server system 304 may make a decision to serve an interstitial page 312. For example, the security server system 304 may decide to serve the interstitial page when the request and/or request data does not include a valid interstitial cookie. In some examples, the security server system 304 may decide to serve the interstitial page when the request data indicates that the request is not whitelisted traffic, although the security server system 304 may decide to serve the interstitial page based on other factors in other examples.

At 314, the security server system 304 may serve the interstitial page to the client computing device 302. The interstitial page may include instrumentation code that, when executed at the client computing device 302, collects telemetry data. For example, the instrumentation code may be executed in the client-side browser application 308 that submitted the request to the web server system 306. At 316, the security server system 304 receives telemetry data collected at the client computing device 302 by the executing instrumentation code.

At 318, the security server system 304 may perform a threat analysis on the telemetry data. In this example, the security server system 304 determines, based on the threat analysis, that the request is not from a potential attacker. At 320, based on determining that the request is not from a potential attacker, the security server system 304 may provide an interstitial cookie to the client computing device 302, such as by setting the interstitial cookie at the client-side browser application 308. A valid interstitial cookie may allow subsequent requests from the client-side browser application 308 without collecting telemetry data and/or performing a threat analysis.

Based on determining that the request is not from a potential attacker, the security server system 304 may allow the request, such as by forwarding the request to the web server system 306 at 322. At 324, the security server system 304 may in this example receive the protected resource from the web server system 306. At 326, the security server system 304 may provide the protected resource to the client computing device 302. In some examples, the security server system 304 may provide the protected resource to the client computing device 302 by writing the requested content into the interstitial page displayed by the client-side browser application 308.

Returning Good Visitor

Figure 4:
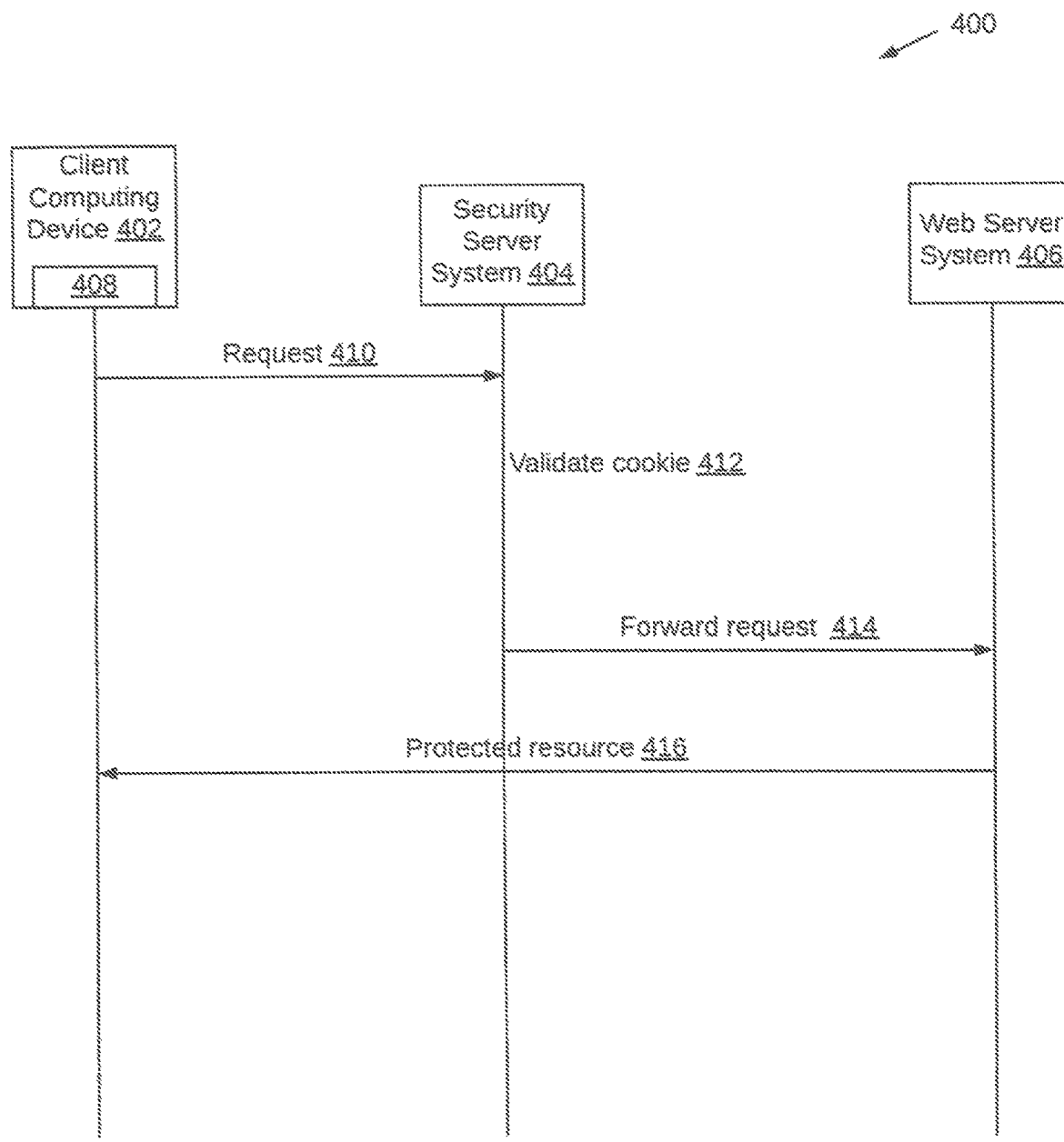
FIG. 4 is a sequence diagram of an example of a method for handling a subsequent request from a client with a valid cookie.

Referring to FIG. 4, a sequence diagram of an example of a method for handling a subsequent request from a visitor with a valid cookie is illustrated. In this example, the method 400 involves a client-side browser application 408 executing at a client computing device 402, a security server system 404, and a web server system 406. The client computing device 408 in FIG. 4 is the same in structure and operation as the client computing device 102 illustrated and described in the examples in FIGS. 1-2, except as otherwise illustrated and described by way of the examples herein. Additionally, the security server system 404 in FIG. 4 is the same in structure and operation as the security server system 140 illustrated and described in the examples in FIGS. 1-2, except as otherwise illustrated and described by way of the examples herein. Further, the web server system 406 in FIG. 4 is the same in structure and operation as the web server system 112 as illustrated and described in the examples in FIGS. 1-2, except as otherwise illustrated and described by way of the examples herein. In some examples, method 400 this takes into account visitors, such as at client computing device 408 in this example, that have been determined to be good agents, by the security server system 404 in this example, and have a valid interstitial cookie.

At 410, the security server system 404 may receive request data describing a request from the client-side browser application 408 of the client computing device 402 to the web server system 406. In this example, the request and/or the request data includes an interstitial cookie, such as an interstitial cookie previously set by the security server system 404 after a client-side browser application 408 passes a prior threat analysis. The request may be for example be for a protected page or other protected resource at the web server system 406, although other types of content may be requested. The security server system 404 may directly receive the request data from the client computing device 402, or may indirectly receive the request data, such as from the web server system 406.

At 412, the security server system 404 may validate the interstitial cookie. For example, the security server system 404 may check that the interstitial cookie is not faked and/or that the interstitial cookie is not used by a different client-side browser application 408, although other types of validations may be executed. In some examples, the security server system 404 may also set an expiration time when the interstitial cookie is originally set after which the interstitial cookie is no longer valid. A valid interstitial cookie may allow subsequent requests from the client-side browser application 408 without performing a threat analysis. In this example, based on determining that the request is associated with a valid interstitial cookie, the security server system 404 may allow the request, such as by forwarding the request to the web server system 406 at 414. In some examples, the web server system 406 provides the protected resource 416 to the client computing device 402, either directly or indirectly, such as via the security server system 404.

Whitelisted Visitor

Figure 5:
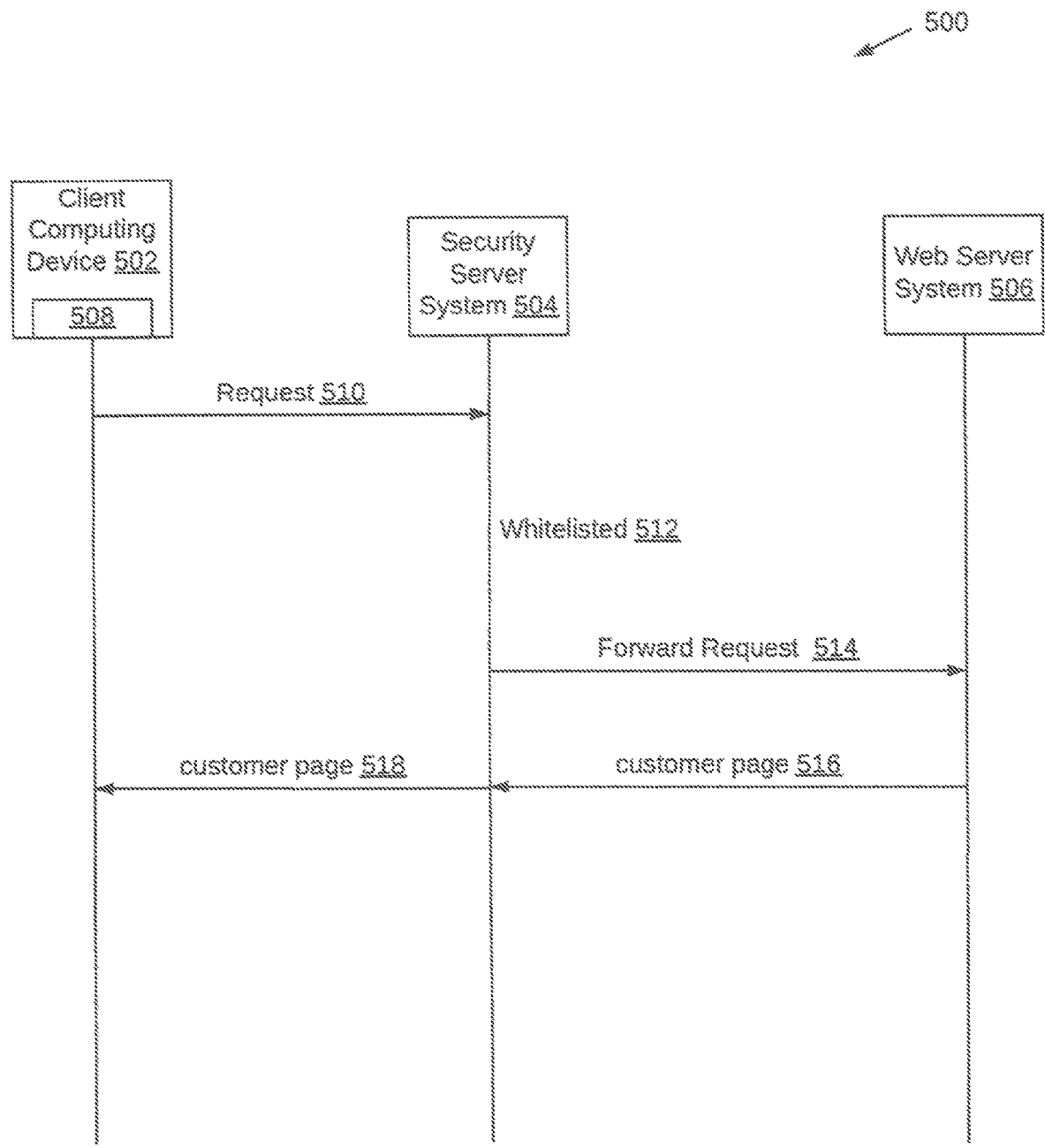
FIG. 5 is a sequence diagram of an example of a method for handling a request from a whitelisted entity.

Referring to FIG. 5, a sequence diagram of an example of a method for handling a subsequent request from a whitelisted entity is illustrated. In this example, the method 500 involves a client-side browser application 508 executing at a client computing device 502, a security server system 504, and a web server system 506. The client computing device 508 in FIG. 5 is the same in structure and operation as the client computing device 102 illustrated and described in the examples in FIGS. 1-2, except as otherwise illustrated and described by way of the examples herein. Additionally, the security server system 504 in FIG. 5 is the same in structure and operation as the security server system 140 illustrated and described in the examples in FIGS. 1-2, except as otherwise illustrated and described by way of the examples herein. Further, the web server system 506 in FIG. 5 is the same in structure and operation as the web server system 112 as illustrated and described in the examples in FIGS. 1-2, except as otherwise illustrated and described by way of the examples herein.

At 512, the security server system 504 in this example determines that the request 510 is whitelisted traffic. Whitelisted traffic may be defined in various ways, such as by a property of the client computing device 502, a property of the traffic, or the like. For example, whitelisted traffic may be defined by a domain, an IP address, a particular client computing device 502, a particular client-side browser application 508, a rate of traffic, or any other way to define whitelisted traffic, including any combination thereof.

A request that meets a definition of whitelisted traffic may be allowed by the security server system 504 without performing a threat analysis. Based on determining that the request 510 is whitelisted traffic, the security server system 504 may allow the request 510, such as by forwarding the request 510 to the web server system 506 at 514. In some examples, the web server system 506 provides the protected resource (e.g., customer page) to the client computing device 502, either directly (e.g., as shown at 518) or indirectly (e.g., as shown at 516), such as via the security server system 504.

Potential Attacker

Figure 6:
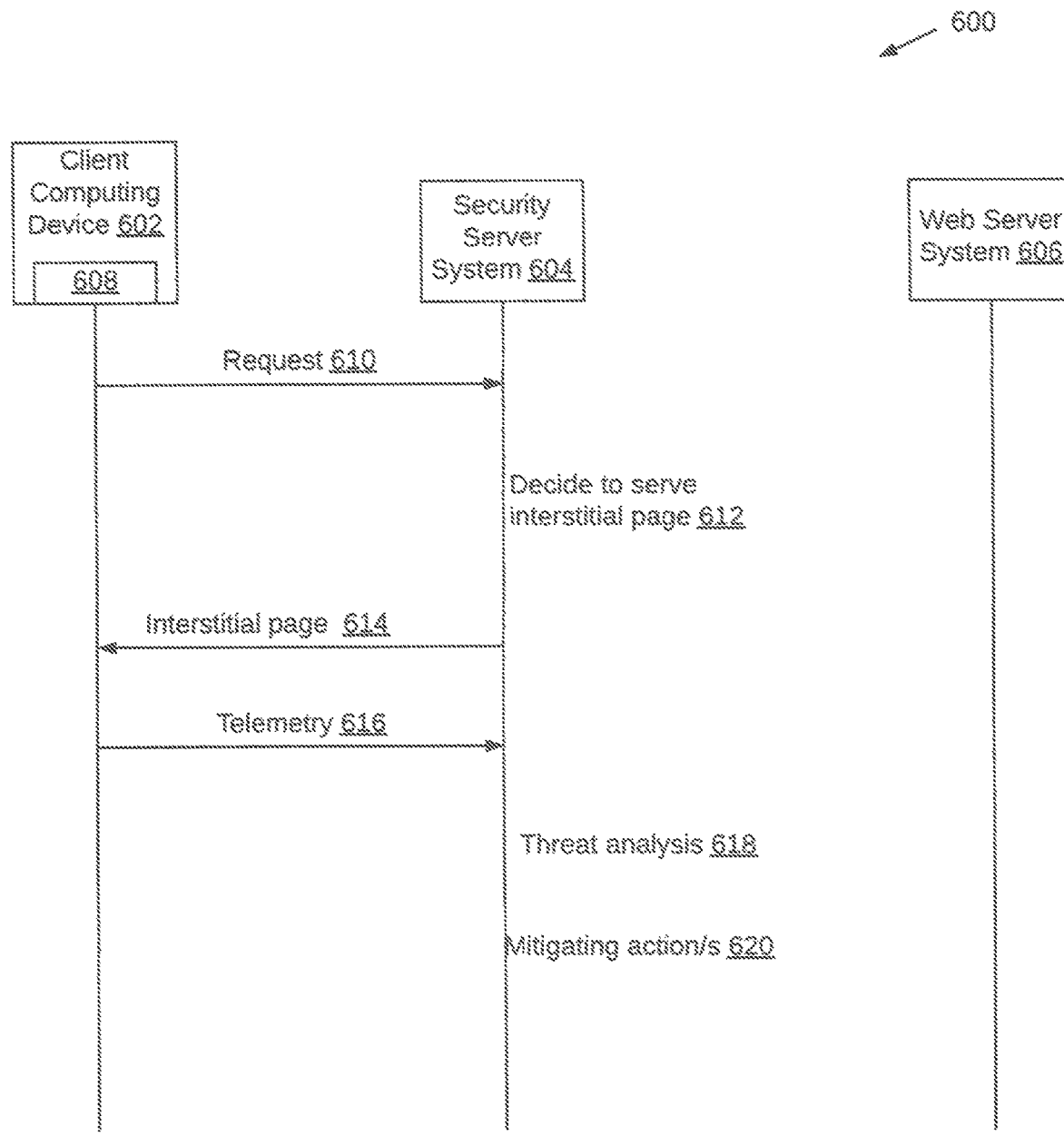
FIG. 6 is a sequence diagram of an example of a method for handling a request from a potential attacker.

Referring to FIG. 6, a sequence diagram of an example of a method for handling a subsequent request from a potential attacker is illustrated. In this example, the method 600 involves a client-side browser application 608 executing at a client computing device 602, a security server system 604, and a web server system 606. The client computing device 608 in FIG. 6 is the same in structure and operation as the client computing device 102 illustrated and described in the examples in FIGS. 1-2, except as otherwise illustrated and described by way of the examples herein. Additionally, the security server system 604 in FIG. 6 is the same in structure and operation as the security server system 140 illustrated and described in the examples in FIGS. 1-2, except as otherwise illustrated and described by way of the examples herein. Further, the web server system 606 in FIG. 6 is the same in structure and operation as the web server system 112 as illustrated and described in the examples in FIGS. 1-2, except as otherwise illustrated and described by way of the examples herein. In some examples, method 600 takes into account traffic that does not pass threat analysis. For example, the threat analysis may be configured to detect traffic generated by automated software so that requests generated by automated software will not pass the threat analysis.

At 610, the security server system 604 receives request data describing a request from the client-side browser application 608 to the web server system 606. The request may be for a protected page or other protected resource at the web server system 606, although other types of content may be requested. The security server system 604 may directly receive the request data from the client computing device 602, or may indirectly receive the request data, such as from the web server system 606.

At 612, the security server system 604 makes a decision to serve an interstitial page 612. For example, the security server system 604 may decide to serve the interstitial page when the request from the client computing device 602 does not include a valid interstitial cookie. In some examples, the security server system 604 decides to serve the interstitial page to the client computing device 602 when the request is not whitelisted traffic.

At 614, the security server system 604 serves the interstitial page to the client computing device 602. In this example, the interstitial page includes instrumentation code that, when executed at the client computing device 602, collects telemetry data. For example, the instrumentation code may be executed in the client-side browser application 608 that submitted the request to the web server system 606. At 616, the security server system 604 receives telemetry data collected at the client computing device 602 by the executing instrumentation code.

At 618, the security server system 604 performs a threat analysis on the telemetry data. The security server system 604 determines, based on the threat analysis that the request is from a potential attacker. For example, the threat analysis may be configured to detect traffic generated by automated software so that requests generated by automated software will not pass the threat analysis.

At 620, based on determining that the request from the client computing device 602 is from a potential attacker, the security server system 604 performs one or more mitigating actions. For example, the security server system 604 can notify the web server system 606, update one or more records on potential threats, block or drop the request so that the requested resource is not provided to the client computing device 602, require additional security measures for traffic from the client computing device 602 and/or the client-side browser application 608, instruct the interstitial page to redirect the client to some other chosen or otherwise set URL or any other mitigating action that can mitigate potential security issues reflected by the result of the threat analysis.

Example System Architecture

A security server system (e.g. security server system 140) may include one or more server systems that provide instrumentation code to client computing devices (e.g. client computing device 102) and process telemetry data received from the client computing devices when the instrumentation code executes on the client computing devices.

Figure 7:
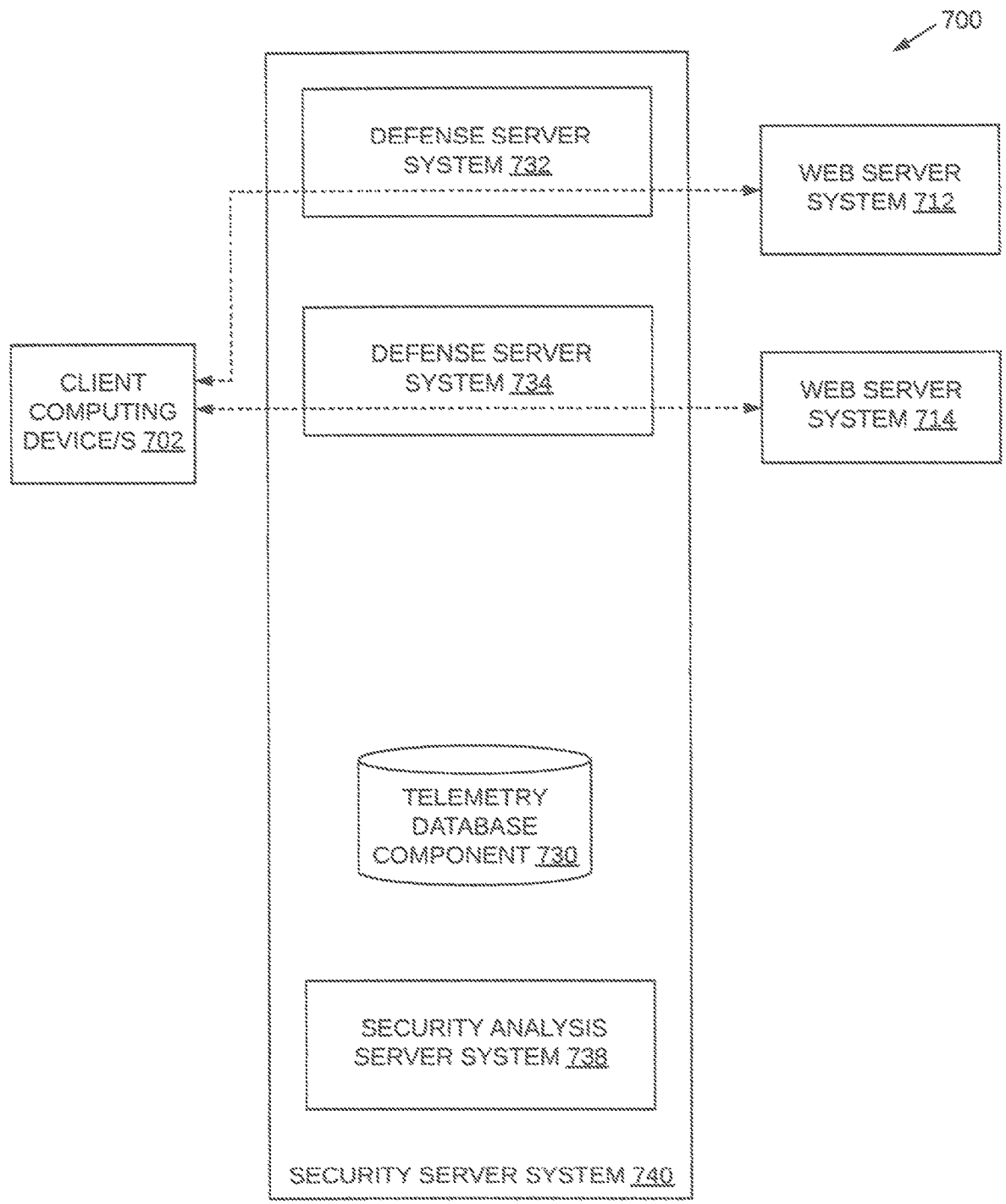
FIG. 7 is a clock diagram of another security system that includes a security server system.

Referring to FIG. 7, a block diagram of an example of a computer system 700 that includes a security server system 740 is illustrated. In this example, the security server system 740 that implements advanced interstitial techniques to protect one or more web server systems 712-714 when one or more client computing devices 702 interact with web content hosted by the web server systems 712-714. In some examples, one or more of the security server systems 140, 304, 404, 504, and 504 as illustrated and described in the examples in FIGS. 1, 3-6 may be the same in structure and operation as the security server system 740 in FIG. 7.

The security server system 740 may include one or more defense server systems 732-734. In this example, a defense server system 732-734 is associated with one or more web server systems 712-714. The defense server system 732-734 may perform actions relating to transactions and/or other interactions between client computing device/s 702 and the associated web server system/s 712-714. A defense server system 732 that is associated with a particular web server system 712 may perform one or more actions during interactions between client computing device 702 and the particular web server system 712.

For example, when client computing device/s 702 interact with a particular web server system 712 associated with a particular defense server system 732, the defense server system 732 provides instrumentation code to the client computing device/s 702 and processes telemetry data collected at the client computing device/s 702 when the corresponding instrumentation code executes at the client computing device/s 702. The defense server system 732 may store telemetry data corresponding to the interactions in a telemetry database component 730 of the security server system 740. The data stored in the telemetry database component 730 may be available across the security server system 740. For example, another defense server system 734 may use the telemetry database component 730 collected based on interactions with the one web server system 712 to protect a second web server system 714.

A defense server system 732-734 may be positioned in different network configurations with respect to the client computing device/s 702 and an associated web server system 712-714. For example a defense server system 732-734 may be deployed in an in-line configuration, an out-of-band configuration, or another configuration that allows the defense server system 732-734 to perform actions relating to transactions and/or other interactions as they occur between client computing device/s 702 and one or more web server systems 712-714.

In an in-line configuration, a defense server system 732-734 may act as a reverse proxy server to an associated web server system 712-714 by intercepting one or more communications between the client computing device/s 702 and the associated web server system 712-714. As a reverse proxy server, the defense server system 732-734 retrieves resources, such as web content, on behalf of clients at client computing device/s 702 of the associated web server systems 712-714. To the client computing device/s 702, the resources appears to originate from the associated web server system 712-714. The defense server system 732-734 may be deployed locally to the web server system 712-714 or deployed over the Internet with respect to the web server system 712-714, such as in a cloud computing system managed by a security company, and/or in a computer system operated by a security company. For example, the defense server system 732-734 may intercept messages to the client computing device/s 702 and add instrumentation code for execution at the client computing device/s 702. As another example, the defense server system 732-734 may intercept requests to the associated web server system 712-714 that include collected telemetry data from the client computing device/s 702, process the telemetry data, and forward the requests to the associated web server system 712-714.

In an out-of-band configuration, a defense server system 732-734 may be involved in transactions and/or other interactions without intercepting communications between the client computing device/s 702 and the associated web server system 712-714. For example, a web server system 712-714 may obtain instrumentation code from the corresponding defense server system 732-734, provide the instrumentation code to the client computing device/s 702, receive telemetry data generated at the client computing device/s 702, and/or provide the corresponding defense server system 732-734 the telemetry data received from the client computing device/s 702.

Implementing Security Countermeasures

In some examples, the security server system 740 is operated by a security company or another entity that provides web security services. One or more web server systems 712-714 may be operated by security service customers, or entities that are provided security services by the security company. The security server system 740 may protect the web server systems 712-714 of security service customers from attacks, such as attacks by malicious automated software executing on one or more client computing devices 702.

In some examples, the defense server systems 732-734 may analyze transactions and/or other interactions between the client computing devices 702 and the associated web server systems 712-714 to detect and mitigate attacks on the associated web server systems 712-714. For example, a defense server system 732-734 may collect and evaluate telemetry data corresponding to a transaction to determine whether the transaction is involved in an attack, such as whether a client computing device 702 involved in the transaction is controlled by automated malicious software. The defense server systems 732-734 may analyze telemetry data for an interaction to prevent an attack in real time, such as by such as blocking, redirecting, or flagging communications that correspond to the interaction.

When analyzing telemetry data to provide security services, the defense server systems 732-734 may store the telemetry data in the telemetry database component 730. Telemetry data stored in the telemetry database component 730, including any telemetry data collected to implement security services, is available for implementing advanced interstitial techniques. In some examples, telemetry data stored in the telemetry database component 730, including any telemetry data collected to implementing advanced interstitial techniques, is available for security analysis, such as by the security analysis server system 738.

The security server system 740 may include a security analysis server system 738 that evaluates telemetry data collected at the client computing device/s 702 to detect signatures or other properties of transactions initiated by malicious software executing on the client computing device/s 702. The security analysis server system 738 may use the telemetry data set to learn about new attacks and/or to deploy new countermeasures for real-time attack detection and prevention. For example, the security analysis server system 738 may update the defense server systems 732-734 with the new countermeasures so that the defense server systems 732-734 may use the new security countermeasures to process transactions between associated web server systems 712-714 and client computing device/s 702 in real time.

Setting Interstitial Cookies at Other Times

In some examples, an interstitial cookie is set at a client-side browser application 106 based on telemetry data collected at another point in time. For example, a defense server system 732-734 may add instrumentation code to, or otherwise integrate instrumentation code with web content served by the associated web server system 712-714, such as for another security purpose. For example, a defense server system 732-734 may provide instrumentation code for one or more specific transaction types, such as login transactions, other authentication transactions, purchase transactions, financial transactions, data submission, account creation, and/or other transaction types.

The instrumentation code provided for the other security purpose may collect a more comprehensive set of telemetry data in some examples. For example, a defense server system 732-734 may add instrumentation code to a login page. When a user is expected to enter his/her credentials on the login page, the instrumentation code may execute in the background to collect the more comprehensive set of telemetry data. When the user submits the login request, the telemetry data collected by the instrumentation code may be submitted with the login request so that the telemetry data may be used to evaluate and/or secure the login request.

In some examples, a security server system 740 may performs a threat analysis on the telemetry data collected in the background for another security purpose. Based on the threat analysis, the security server system 740 may determine whether or not to set an interstitial cookie at a client computing device 702 for later use when the client computing device 702 requests a protected resource, although this method may work for other types of content that is requested.

Example Processes

Figure 8:
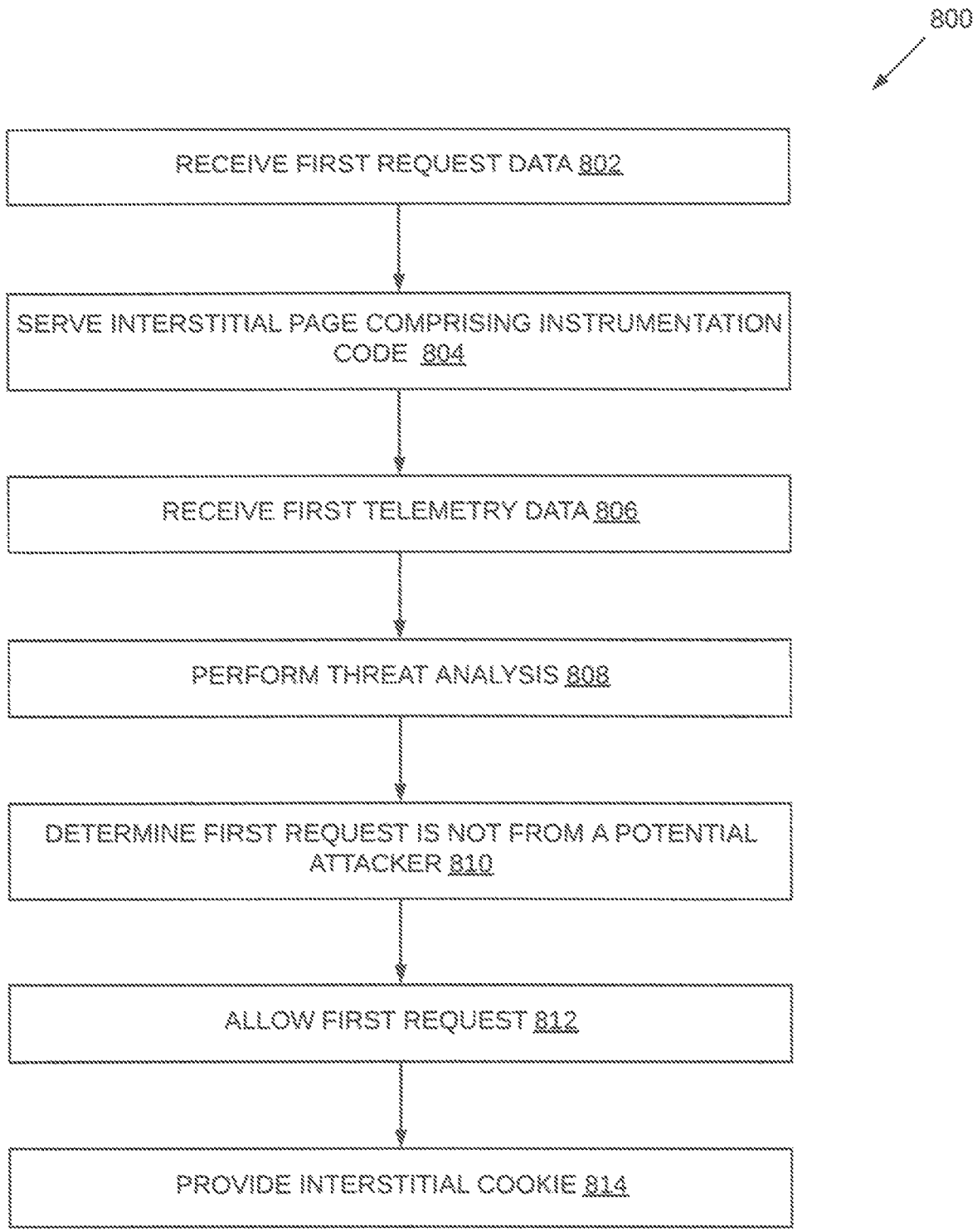
FIG. 8 is a flow diagram of a method using advanced interstitial techniques for web security.

Referring to FIG. 8, a flow chart of an example of a method for using advanced interstitial techniques for web security is illustrated. In this example, the method 800 may be performed by one or more computing devices and/or processes thereof. For example, one or more steps of method 800 may be performed by a computer system, such as but not limited to computer system 900. In some examples, one or more steps of method 800 are performed by a security server system, which may include one or more defense server systems, companion server systems, and/or analysis server systems. Method 800 will be described with respect to security server system 140, but is not limited to performance by such and may be used with other types of security server systems.

At step 802, the security server system 140 receives first request data. The first request data describes a first request from a client computing device (e.g. client computing device 102) to a web server system (e.g. web server system 112). In some examples, the first request is a GET request to obtain web content (e.g. web content 122) from the web server system 112. The web content may include one or more protected resources, although other types of content may be requested. In some examples, the first request data comprises the first request. For example, the security server system 140 may act as a reverse proxy server to the web server system and intercept the first request.

At step 804, the security server system 140 may serve an interstitial page to the client computing device. The interstitial page includes instrumentation code that, when executed at the requesting client computing device 102, collects first telemetry data.

At step 806, the security server system 140 receives the first telemetry data from the requesting client computing device 102.

At step 808, the security server system 140 performs threat analysis on the first telemetry data collected in association with the first request.

At step 810, the security server system 140 in this example determines, based on the threat analysis that the first request from the requesting client computing device 102 is not from a potential attacker.

At step 812, based on determining that the first request is not from a potential attacker in this example, the security server system 140 allows the first request. In some examples, the security server system 140 allows the first request by forwarding the first request to the web server system 112. In some examples, allowing the first request includes obtaining a response to the first request from the web server system 112, and writing the response to the first request into the interstitial page at the requesting client computing device 102.

At step 814, based on determining that the first request is not from a potential attacker, the security server system 140 provides an interstitial cookie to the requesting client computing device 102. When validated, the interstitial cookie allows a subsequent request from the client computing device 102 associated with the prior request in this example without performing threat analysis on subsequent telemetry data collected in association with the subsequent request.

Implementation Mechanisms—Hardware Overview

According to one example, the techniques described herein are implemented by one or more special-purpose computing devices. The special-purpose computing devices may be hard-wired to perform one or more techniques described herein, including combinations thereof. Alternatively and/or in addition, the one or more special-purpose computing devices may include digital electronic devices such as one or more application-specific integrated circuits (ASICs) or field programmable gate arrays (FPGAs) that are persistently programmed to perform the techniques. Alternatively and/or in addition, the one or more special-purpose computing devices may include one or more general purpose hardware processors programmed to perform the techniques described herein pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices and/or any other device that incorporates hard-wired or program logic to implement the techniques.

Figure 9:
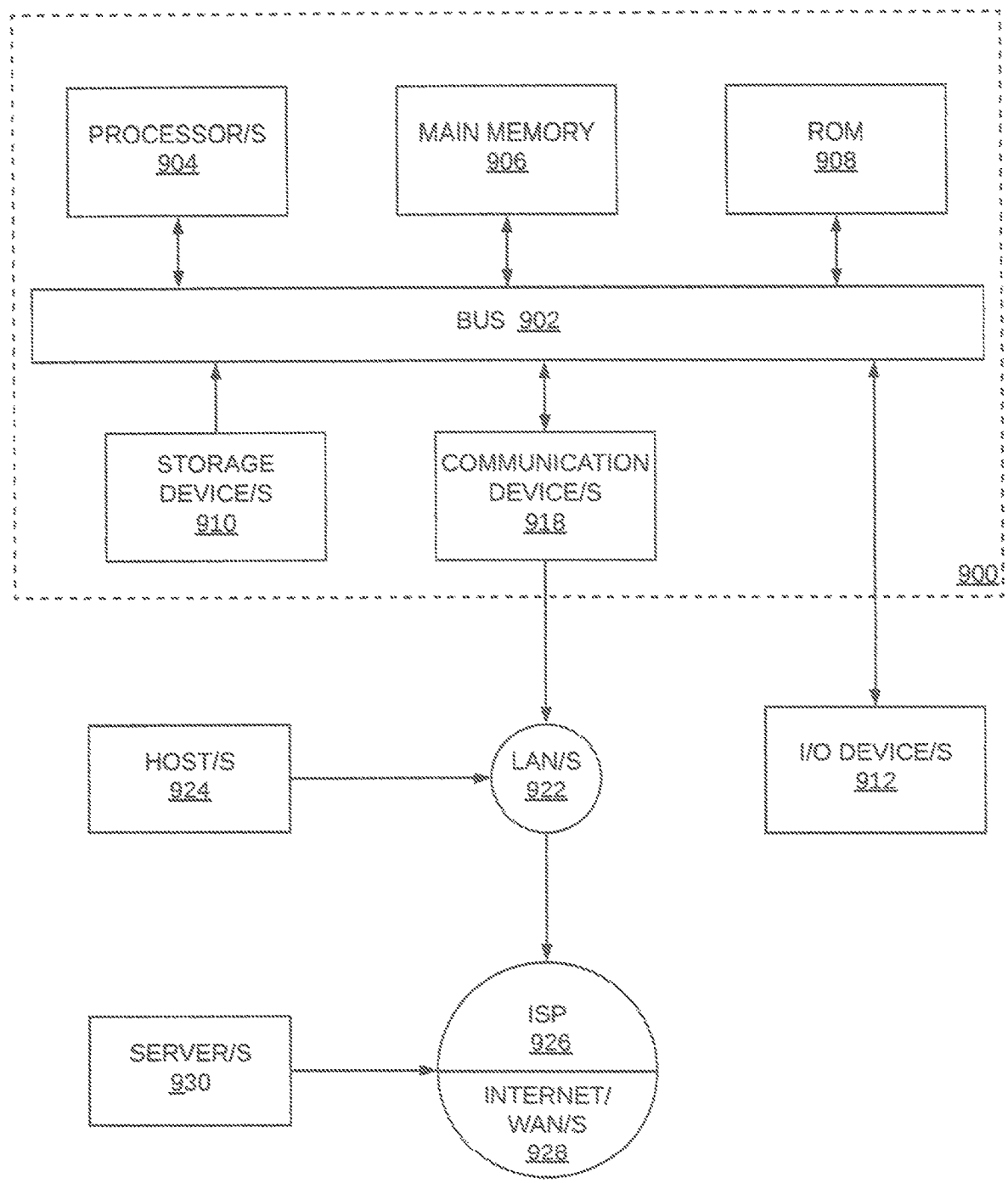
FIG. 9 is a block diagram of a computer system upon which one or more examples of this technology may be implemented.

Referring to FIG. 9, a block diagram of a computer system upon which this technology may be implemented as illustrated by way of the examples herein. Computer system 900 may include a bus 902 or other communication mechanism for communicating information, and one or more hardware processors 904 coupled with bus 902 for processing information, such as basic computer instructions and data. Hardware processor/s 904 may include, for example, one or more general-purpose microprocessors, graphical processing units (GPUs), coprocessors, central processing units (CPUs), and/or other hardware processing units.

Computer system 900 may also include one or more units of main memory 906 coupled to bus 902, such as random access memory (RAM) or other dynamic storage, for storing information and instructions to be executed by processor/s 904. Main memory 906 may also be used for storing temporary variables or other intermediate information during execution of instructions to be executed by processor/s 904. Such instructions, when stored in non-transitory storage media accessible to processor/s 904, turn computer system 900 into a special-purpose machine that is customized to perform the operations specified in the instructions. In some examples, main memory 906 may include dynamic random-access memory (DRAM) (including but not limited to double data rate synchronous dynamic random-access memory (DDR SDRAM), thyristor random-access memory (T-RAM), zero-capacitor (Z-RAM™)) and/or non-volatile random-access memory (NVRAM).

Computer system 900 may further include one or more units of read-only memory (ROM) 908 or other static storage coupled to bus 902 for storing information and instructions for processor/s 904 that are either always static or static in normal operation but reprogrammable. For example, ROM 908 may store firmware for computer system 900. ROM 908 may include mask ROM (MROM) or other hard-wired ROM storing purely static information, programmable read-only memory (PROM), erasable programmable read-only memory (EPROM), electrically-erasable programmable read-only memory (EEPROM), another hardware memory chip or cartridge, or any other read-only memory unit.

One or more storage devices 910, such as a magnetic disk or optical disk, is provided and coupled to bus 902 for storing information and/or instructions. Storage device/s 910 may include non-volatile storage media such as, for example, read-only memory, optical disks (such as but not limited to compact discs (CDs), digital video discs (DVDs), Blu-ray discs (BDs)), magnetic disks, other magnetic media such as floppy disks and magnetic tape, solid state drives, flash memory, optical disks, one or more forms of non-volatile random access-memory (NVRAM), and/or other non-volatile storage media.

Computer system 900 may be coupled via bus 902 to one or more input/output (I/O) devices 912. For example, I/O device/s 912 may include one or more displays for displaying information to a computer user, such as a cathode ray tube (CRT) display, a Liquid Crystal Display (LCD) display, a Light-Emitting Diode (LED) display, a projector, and/or any other type of display.

I/O device/s 912 may also include one or more input devices, such as an alphanumeric keyboard and/or any other key pad device. The one or more input devices may also include one or more cursor control devices, such as a mouse, a trackball, a touch input device, or cursor direction keys for communicating direction information and command selections to processor 904 and for controlling cursor movement on another I/O device (e.g. a display). This input device typically has at degrees of freedom in two or more axes, (e.g. a first axis x, a second axis y, and optionally one or more additional axes z . . . ), that allows the device to specify positions in a plane. In some examples, the one or more I/O device/s 912 may include a device with combined I/O functionality, such as a touch-enabled display.

Other I/O device/s 912 may include a fingerprint reader, a scanner, an infrared (IR) device, an imaging device such as a camera or video recording device, a microphone, a speaker, an ambient light sensor, a pressure sensor, an accelerometer, a gyroscope, a magnetometer, another motion sensor, or any other device that can communicate signals, commands, and/or other information with processor/s 904 over bus 902.

Computer system 900 may implement the techniques described herein using customized hard-wired logic, one or more ASICs or FPGAs, firmware or program logic which, in combination with the computer system causes or programs, causes computer system 900 to be a special-purpose machine. According to one example, the techniques herein are performed by computer system 900 in response to processor/s 904 executing one or more sequences of one or more instructions contained in main memory 906. Such instructions may be read into main memory 906 from another storage medium, such as one or more storage device/s 910. Execution of the sequences of instructions contained in main memory 906 causes processor/s 904 to perform the method steps described herein. In alternative examples, hard-wired circuitry may be used in place of or in combination with software instructions.

Computer system 900 may also include one or more communication interfaces 918 coupled to bus 902. Communication interface/s 918 provide two-way data communication over one or more physical or wireless network links 920 that are connected to a local network 922 and/or a wide area network (WAN), such as the Internet. For example, communication interface/s 918 may include an integrated services digital network (ISDN) card, cable modem, satellite modem, or a modem to provide a data communication connection to a corresponding type of telephone line. Alternatively and/or in addition, communication interface/s 918 may include one or more of: a local area network (LAN) device that provides a data communication connection to a compatible local network 922; a wireless local area network (WLAN) device that sends and receives wireless signals (such as electrical signals, electromagnetic signals, optical signals or other wireless signals representing various types of information) to a compatible LAN; a wireless wide area network (WWAN) device that sends and receives such signals over a cellular network access a wide area network (WAN, such as the Internet 928); and other networking devices that establish a communication channel between computer system 900 and one or more LANs 922 and/or WANs.

Network link/s 920 typically provides data communication through one or more networks to other data devices. For example, network link/s 920 may provide a connection through one or more local area networks 922 (LANs) to one or more host computers 924 or to data equipment operated by an Internet Service Provider (ISP) 926. ISP 926 in turn provides connectivity to one or more wide area networks 928, such as the Internet. LAN/s 922 and WAN/s 928 both use electrical, electromagnetic or optical signals that carry digital data streams. The signals through the various networks and the signals on network link/s 920 and through communication interface/s 918 are example forms of transmission media, or transitory media.

The term "storage media" as used herein refers to any non-transitory media that stores data and/or instructions that cause a machine to operate in a specific fashion. Such storage media may include volatile and/or non-volatile media. Storage media is distinct from but may be used in conjunction with transmission media. Transmission media participates in transferring information between storage media. For example, transmission media includes coaxial cables, copper wire and fiber optics, including traces and/or other physical electrically conductive components that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its main memory 906 and send the instructions over a telecommunications line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 can send messages and receive data, including program code, through the network(s), network link 920 and communication interface 918. In the Internet example, one or more servers 930 might transmit signals corresponding to data or instructions requested for an application program executed by the computer system 900 through the Internet 928, ISP 926, local network 922 and a communication interface 918. The received signals may include instructions and/or information for execution and/or processing by processor/s 904. Processor/s 904 may execute and/or process the instructions and/or information upon receiving the signals by accessing main memory 906, or at a later time by storing them and then accessing them from storage device/s 910.

Other Aspects of Disclosure

In the foregoing specification, examples of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method implemented by a security server system comprising one or more security server apparatuses, server devices, or client devices, the method comprising:
   receiving a first request of one or more requests from a client to a web server system;
   serving an interstitial page to the client, the interstitial page comprising instrumentation code that, when executed at the client, collects telemetry data;
   receiving the telemetry data from the client;
   performing a threat analysis on the telemetry data collected in association with the first request to determine whether the first request is from a potential attacker; and
   responsive to determining, based on the performing the threat analysis that first request is not from a potential attacker, allowing the first request, wherein allowing the first request comprises:
   obtaining a response to the first request from the web server system, the response comprising requested content associated with a protected resource of the web server system; and
   writing the requested content into the interstitial page at the client.

2. The method of claim 1, further comprising:
   providing an interstitial cookie to the client that, when validated, allows a second request from the client without performing the threat analysis on subsequent telemetry data collected in association with the second request.

3. The method of claim 1, wherein allowing the first request comprises:
   forwarding the first request to the web server system.

4. The method of claim 2, further comprising:
   receiving the second request from the client along with the interstitial cookie;
   determining when the interstitial cookie is valid; and
   allowing the second request when the determination indicates the interstitial cookie is valid.

5. The method of claim 2, further comprising:
   receiving the second request from the client along with the interstitial cookie;
   determining that the interstitial cookie is not valid;
   serving a subsequent interstitial page to the client when the determination indicates the interstitial cookie is invalid, the subsequent interstitial page comprising instrumentation code that, when executed at the client, collects subsequent telemetry data;
   receiving the subsequent telemetry data from the client; and
   performing the threat analysis on the subsequent telemetry data collected in association with the second request to determine whether the second request is from a potential attacker;

responsive to determining, based on the performing the threat analysis that second request is not from a potential attacker:
    allowing the second request; and
    providing another interstitial cookie to the client that, when validated, allows a third request from the client without performing the threat analysis on further subsequent telemetry data collected in association with the third request.

6. The method of claim 1, wherein responsive to determining, based on performing the threat analysis, that the first request is from the potential attacker:
    performing a mitigating action related to the first request.

7. The method of claim 1, further comprising:
    determining when the first request comprises whitelisted traffic; and
    allowing the first request without the serving the interstitial page to the client, receiving the telemetry data, and performing the threat analysis.

8. A security server device, comprising memory comprising programmed instructions stored thereon and one or more processors configured to be capable of executing the stored programmed instructions to:
    receive a first request from a client to a web server system;
    serve an interstitial page to the client, the interstitial page comprising instrumentation code that, when executed at the client, collects telemetry data;
    receive the telemetry data from the client;
    perform a threat analysis on the telemetry data collected in association with the first request to determine whether the first request is from a potential attacker; and
    responsive to determining, based on the performing the threat analysis that first request is not from a potential attacker, allow the first request, wherein allowing first request comprises:
        obtaining a response to first request from the web server system, the response comprising requested content associated with a protected resource of the web server system; and
        writing the requested content into the interstitial page at the client.

9. The device of claim 8, wherein the one or more processors are further configured to be capable of executing the stored programmed instructions to:
    provide an interstitial cookie to the client that, when validated, allows a second request from the client without performing the threat analysis on subsequent telemetry data collected in association with the second request.

10. The device of claim 8, wherein for the allow the first request, the one or more processors are further configured to be capable of executing the stored programmed instructions to:
    forward the first request to the web server system.

11. The device of claim 9, wherein the one or more processors are further configured to be capable of executing the stored programmed instructions to:
    receive the second request from the client along with the interstitial cookie;
    determine when the interstitial cookie is valid; and
    allow the second request when the determination indicates the interstitial cookie is valid.

12. The device of claim 9, wherein the one or more processors are further configured to be capable of executing the stored programmed instructions to:
    receive the second request from the client along with the interstitial cookie;
    determine that the interstitial cookie is not valid;
    serve a subsequent interstitial page to the client when the determination indicates the interstitial cookie is invalid, the subsequent interstitial page comprising instrumentation code that, when executed at the client, collects subsequent telemetry data;
    receive the subsequent telemetry data from the client; and
    perform the threat analysis on the subsequent telemetry data collected in association with the second request to determine whether the second request is from a potential attacker;
    responsive to determining, based on the performing the threat analysis that second request is not from a potential attacker:
        allow the second request; and
        provide another interstitial cookie to the client that, when validated, allows a third request from the client without performing the threat analysis on further subsequent telemetry data collected in association with the third request.

13. The device of claim 8, wherein responsive to determining, based on performing the threat analysis, that the first request is from a potential attacker, the executable code, when executed by the one or more processors further causes the one or more processors to:
    perform a mitigating action related to the first request.

14. The device of claim 8, wherein the executable code, when executed by the one or more processors further causes the one or more processors to:
    determine when the first request comprises whitelisted traffic; and
    allow the first request without serving the interstitial page to the client, receiving the telemetry data, and performing the threat analysis.

15. A non-transitory computer readable medium having stored thereon instructions comprising executable code that, when executed by one or more processors, causes the one or more processors to:
    receive a first request from a client to a web server system;
    serve an interstitial page to the client, the interstitial page comprising instrumentation code that, when executed at the client, collects telemetry data;
    receive the telemetry data from the client;
    perform a threat analysis on the telemetry data collected in association with the first request to determine whether the first request is from a potential attacker; and
    responsive to determining, based on the performing the threat analysis that the first request is not from a potential attacker, allow the first request, wherein allowing the first request comprises:
        obtaining a response to the first request from the web server system, the response comprising requested content associated with a protected resource of the web server system; and
        writing the requested content into the interstitial page at the client.

16. The device of claim 15, wherein the executable code, when executed by the one or more processors further causes the one or more processors to:
    provide an interstitial cookie to the client that, when validated, allows a second request from the client without performing the threat analysis on subsequent telemetry data collected in association with the second request.

17. The non-transitory computer readable medium of claim 15, wherein for the allow the first request, the executable code, when executed by the one or more processors further causes the one or more processors to:
forward the first request to the web server system.

18. The non-transitory computer readable medium of claim 16, wherein the executable code, when executed by the one or more processors further causes the one or more processors to:
receive the second request from the client along with the interstitial cookie;
determine when the interstitial cookie is valid; and
allow the second request when the determination indicates the interstitial cookie is valid.

19. The non-transitory computer readable medium of claim 16, wherein the executable code, when executed by the one or more processors further causes the one or more processors to:
receive the second request from the client along with the interstitial cookie;
determine that the interstitial cookie is not valid;
serve a subsequent interstitial page to the client when the determination indicates the interstitial cookie is invalid, the subsequent interstitial page comprising instrumentation code that, when executed at the client, collects subsequent telemetry data;
receive the subsequent telemetry data from the client; and
perform the threat analysis on the subsequent telemetry data collected in association with the second request to determine whether the second request is from a potential attacker;
responsive to determining, based on the performing the threat analysis that second request is not from a potential attacker:
allow the second request; and
provide another interstitial cookie to the client that, when validated, allows a third request from the client without performing the threat analysis on further subsequent telemetry data collected in association with the third request.

20. The non-transitory computer readable medium of claim 15, wherein responsive to determining, based on performing the threat analysis, that the first request is from a potential attacker, the executable code, when executed by the one or more processors further causes the one or more processors to:
perform a mitigating action related to first request.

21. The non-transitory computer readable medium of claim 15, wherein the executable code, when executed by the one or more processors further causes the one or more processors to:
determine when the first request comprises whitelisted traffic; and
allow the first request without serving the interstitial page to the client, receiving the telemetry data, and performing the threat analysis.

22. A security system, comprising one or more security server apparatuses, server devices, or client devices with memory comprising programmed instructions stored thereon and one or more processors configured to be capable of executing the stored programmed instructions to:
receive a first request from a client to a web server system;
serve an interstitial page to the client, the interstitial page comprising instrumentation code that, when executed at the client, collects telemetry data;
receive the telemetry data from the client;
perform a threat analysis on the telemetry data collected in association with the first request to determine whether the first request is from a potential attacker; and
responsive to determining, based on the performing the threat analysis that first request is not from a potential attacker, allow the first request, wherein allowing the first request comprises:
obtaining a response to the first request from the web server system, the response comprising requested content associated with a protected resource of the web server system; and
writing the requested content into the interstitial page at the client.

23. The system of claim 22, wherein the one or more processors are further configured to be capable of executing the stored programmed instructions to:
provide an interstitial cookie to the client that, when validated, allows a second request from the client without performing the threat analysis on subsequent telemetry data collected in association with the second request.

24. The system of claim 22, wherein for the allow the first request, the one or more processors are further configured to be capable of executing the stored programmed instructions to:
forward the first request to the web server system.

25. The system of claim 23, wherein the one or more processors are further configured to be capable of executing the stored programmed instructions to:
receive the second request from the client along with the interstitial cookie;
determine when the interstitial cookie is valid; and
allow the second request when the determination indicates the interstitial cookie is valid.

26. The system of claim 23, wherein the one or more processors are further configured to be capable of executing the stored programmed instructions to:
receive the second request from the client along with the interstitial cookie;
determine that the interstitial cookie is not valid;
serve a subsequent interstitial page to the client when the determination indicates the interstitial cookie is invalid, the subsequent interstitial page comprising instrumentation code that, when executed at the client, collects subsequent telemetry data;
receive the subsequent telemetry data from the client; and
perform the threat analysis on the subsequent telemetry data collected in association with the second request to determine whether the second request is from a potential attacker;
responsive to determining, based on the performing the threat analysis that second request is not from a potential attacker:
allow the second request; and
provide another interstitial cookie to the client that, when validated, allows a third request from the client without performing the threat analysis on further subsequent telemetry data collected in association with the third request.

27. The system of claim 22, wherein responsive to determining, based on performing the threat analysis, that the first request is from the potential attacker, the executable code, when executed by the one or more processors further causes the one or more processors to:
perform a mitigating action related to the first request.

28. The system of claim 22, wherein the executable code, when executed by the one or more processors further causes the one or more processors to:
- determine when the first request comprises whitelisted traffic; and
- allow the first request without serving the interstitial page to the client, receiving the telemetry data, and performing the threat analysis.

\* \* \* \* \*